United States Patent
Bhalgat et al.

(10) Patent No.: US 12,136,038 B2
(45) Date of Patent: Nov. 5, 2024

(54) GRADIENT PRUNING FOR EFFICIENT TRAINING OF MACHINE LEARNING MODELS

(71) Applicant: QUALCOMM Incorporated, San Diego, CA (US)

(72) Inventors: Yash Sanjay Bhalgat, San Diego, CA (US); Jin Won Lee, San Diego, CA (US); Jamie Menjay Lin, San Diego, CA (US); Fatih Murat Porikli, Carlsbad, CA (US); Chirag Sureshbhai Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 932 days.

(21) Appl. No.: 17/175,487

(22) Filed: Feb. 12, 2021

(65) Prior Publication Data

US 2022/0261648 A1    Aug. 18, 2022

(51) Int. Cl.
*G06N 3/082* (2023.01)
*G06F 18/214* (2023.01)
*G06N 3/098* (2023.01)
*G06N 20/00* (2019.01)

(52) U.S. Cl.
CPC ......... *G06N 3/082* (2013.01); *G06F 18/2148* (2023.01); *G06N 3/098* (2023.01); *G06N 20/00* (2019.01)

(58) Field of Classification Search
CPC ........ G06N 3/082; G06N 20/00; G06N 3/098; G06F 18/2148
See application file for complete search history.

(56) References Cited

PUBLICATIONS

Mills, Jed, Jia Hu, and Geyong Min. "Communication-efficient federated learning for wireless edge intelligence in IoT." IEEE Internet of Things Journal 7.7 (2019): 5986-5994. (Year: 2019).*
Shao, Rulin, Hui Liu, and Dianbo Liu. "Privacy preserving stochastic channel-based federated learning with neural network pruning." arXiv preprint arXiv:1910.02115 (2019). (Year: 2019).*
Wheatman, Brian, and Helen Xu. "Packed compressed sparse row: A dynamic graph representation." 2018 IEEE High Performance extreme Computing Conference (HPEC). IEEE, 2018. (Year: 2018).*
Ding, Xiaohan, et al. "Global sparse momentum sgd for pruning very deep neural networks." Advances in Neural Information Processing Systems 32 (2019). (Year: 2019).*
Aji A.F., et al., "Sparse Communication for Distributed Gradient Descent", arxiv.org, Cornell University Library, 201 Olin Library Cornell University Ithaca, NY, 14853, Apr. 17, 2017 (Apr. 17, 2017), 6 Pages, XP081399947, p. 1-p. 3.
International Search Report and Written Opinion—PCT/US2022/070241—ISA/EPO—May 9, 2022.

(Continued)

*Primary Examiner* — Eric Nilsson
(74) *Attorney, Agent, or Firm* — Patterson & Sheridan LLP

(57) ABSTRACT

Certain aspects of the present disclosure provide techniques for improved machine learning using gradient pruning, comprising computing, using a first batch of training data, a first gradient tensor comprising a gradient for each parameter of a parameter tensor for a machine learning model; identifying a first subset of gradients in the first gradient tensor based on a first gradient criteria; and updating a first subset of parameters in the parameter tensor based on the first subset of gradients in the first gradient tensor.

30 Claims, 9 Drawing Sheets

(56) References Cited

PUBLICATIONS

Shi S., et al., "A Distributed Synchronous SGD Algorithm with Global Top-k Sparsification for Low Bandwidth Networks", arxiv.org, Cornell University Library, 201 Olin Library Cornell University Ithaca, NY, 14853, Jan. 14, 2019 (Jan. 14, 2019), 12 Pages, XP081005225, p. 2-p. 7.

Sun X., et al., "meProp: Sparsified Back Propagation for Accelerated Deep Learning with Reduced Overfitting", Jun. 19, 2017 (Jun. 19, 2017), pp. 1-10, XP055831224, Retrieved from the Internet: URL: https://arxiv.org/pdf/1706.06197v1.pdf [retrieved on Aug. 10, 2021] the whole document.

Wang F., et al., "An Adaptive and Fully Sparse Training Approach for Multilayer Perceptrons", IEEE International Conference on Neural Networks (ICNN'96), vol. 1, Jun. 6, 1996 (Jun. 6, 1996), pp. 102-107, XP055915487, DOI: 10.1109/ICNN.1996.548874, ISBN: 978-0-7803-3210-2, Sections 2-5, Retrieved from the Internet: URL: https://ieeexplore.ieee.org/stampPDF/getPDF.jsp?ip=&arnumber=548874&ref=aHR0cHM6Ly9pZWVleHBsb3JlLmllZWUub3JnL2RvY3VtZW50LzU0ODg3NA==.

* cited by examiner

GRADIENT PRUNING FOR EFFICIENT TRAINING OF MACHINE LEARNING MODELS

INTRODUCTION

Aspects of the present disclosure relate to machine learning, and in particular to training machine learning models.

Machine learning models, such as artificial neural networks, have been used in a wide variety of domains to provide reliable predictions and classifications. For example, neural networks can be used to identify and classify objects depicted in images, to predict future or unknown values in data, and the like. The wide applicability of machine learning models has driven their adoption in many domains and on many device types, including mobile devices, edge processing devise, Internet of Things (IoT) devices, always-on devices, and the like, in addition to more conventional compute platforms.

Conventional supervised training of machine learning models relies on iteratively exposing a model to large amounts of training data and refining the parameters (e.g., weights and biases) of the model iteratively, such as by using back propagation and gradient descent. In many models, the number of parameters that are trained is significant, and consequently, so too is the training cost in terms of time, compute resources, memory resources, energy use, and the like.

While the theoretical expressivity and performance of a machine learning model is generally increased by the number of trainable parameters, the ability to practically train such a model is hampered by a large number of trainable parameters because of the inherently increased complexity associated with the large number of trainable parameters. Accordingly, there is a need for more efficient methods for training machine learning models that do not compromise the performance of the resulting trained model.

BRIEF SUMMARY

Certain aspects provide a method to train a machine learning model using gradient pruning, comprising: computing, using a first batch of training data, a first gradient tensor comprising a gradient for each parameter of a parameter tensor for a machine learning model; identifying a first subset of gradients in the first gradient tensor based on a first gradient criteria; and updating a first subset of parameters in the parameter tensor based on the first subset of gradients.

Further aspects relate to apparatuses configured to perform the methods described herein as well as non-transitory computer-readable mediums comprising computer-executable instructions that, when executed by a processor of a device, cause the device to perform the methods described herein.

The following description and the related drawings set forth in detail certain illustrative features of one or more aspects.

BRIEF DESCRIPTION OF THE DRAWINGS

The appended figures depict certain aspects of the one or more aspects and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1A:
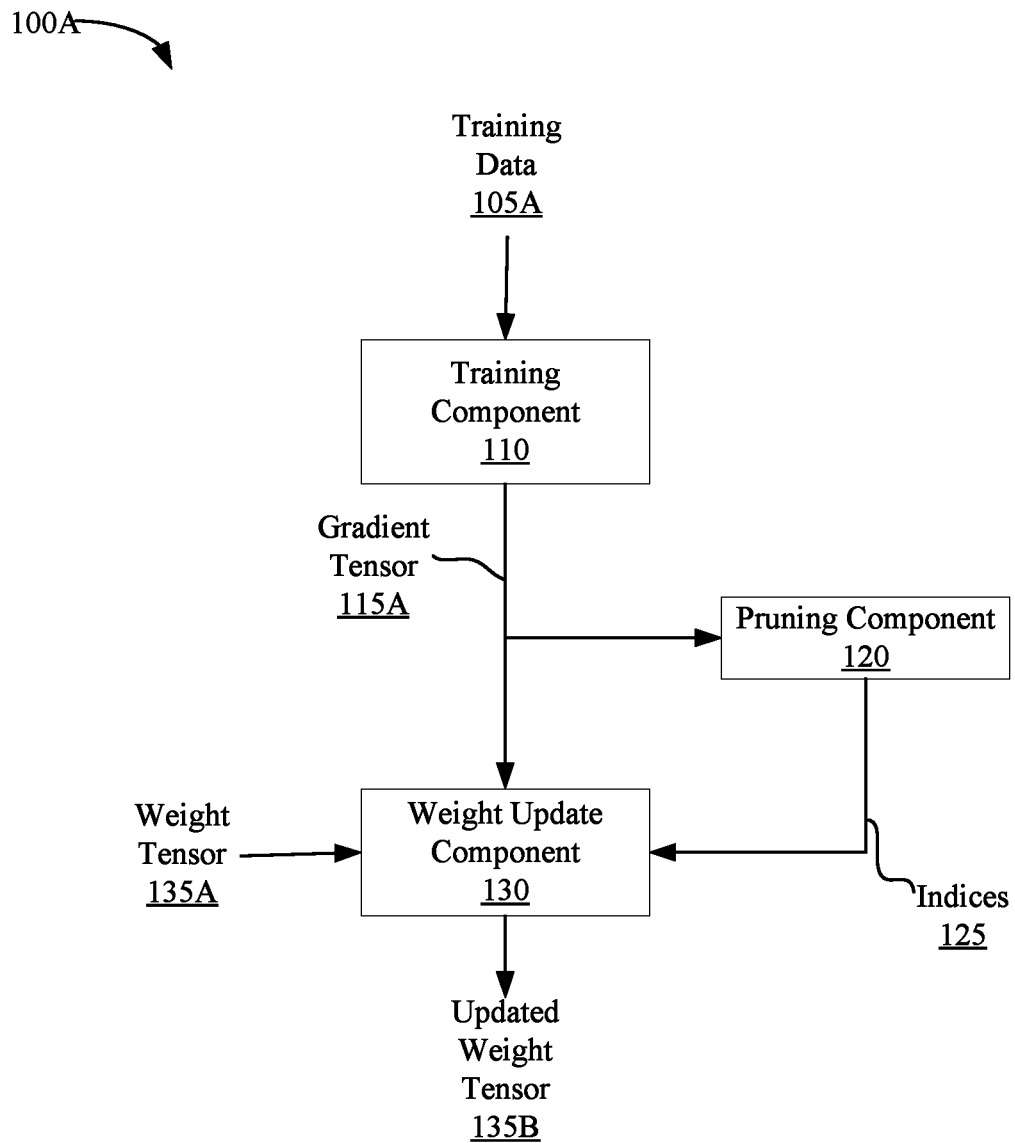
FIGS. 1A and 1B depict workflows for training machine learning models using gradient pruning, according to some aspects disclosed herein.

Aspects of the present disclosure provide apparatuses, methods, processing systems, and computer-readable mediums for gradient pruning to improve the training of machine learning models.

In some aspects of the present disclosure, gradient tensors are pruned according to one or more criteria in order to selectively update model parameters (e.g., weights and biases in a neural network) while refraining from updating other parameters. In conventional systems, all gradients (e.g., the entire gradient tensor) are used to update all model parameters for each round of training. This requires a massive number of operations for every training round.

By selectively pruning the gradient tensor and updating fewer parameters during each training round, aspects of the present disclosure can significantly improve the training process without sacrificing accuracy. Some improvements in the training process described herein include greater training speed, lower power and compute resource consumption, reduced bandwidth required for transmitting updated gradients, and the like. In addition to reduced resource consumption, some aspects disclosed herein enable machine learning models to be trained and deployed on a wider variety of devices due to the reduced energy, time, and resource requirements. For example, techniques described herein enable battery powered devices and devices with relatively limited compute resources to effectively train and maintain models that were previously only practical for more powerful systems.

For example, gradient descent is an optimization algorithm used to find the values for a set of model parameters in order to minimize a cost function associated with the accuracy of the model (e.g., an artificial neural network model). Conventionally gradient descent may be used to generate gradients that are then used to update every single trainable parameter associated with the model. By iteratively computing gradients and updating the parameters, the model learns to generate more accurate outputs.

During the training process, it may be the case that many gradients end up with a magnitude near zero. When a gradient is very small (e.g., near zero), the change to an associated parameter is likewise very small, and thus the change to the overall model output is likewise very small. Generally, as the training process nears completion and parameters of the model approach their optimum values, the gradients get smaller.

Aspects described herein exploit small gradients and their small impact on a model's parameters by selectively pruning such gradients based on, for example, one or more criteria, such as a threshold value. An example is described below with respect to FIG. 3. Selectively pruning small gradients beneficially reduces the computational cost of training a model and thus improving training efficiency while having little impact on the performance of the model, or even improving the performance of the model in some cases. After pruning small gradients, the remaining gradients (e.g., a subset of the total set of gradients) may be used to update the model. Notably, the more gradients that are pruned based on the pruning criteria, the larger the computational cost savings during training.

Gradient pruning may be performed in various manners, such as directly pruning selected gradients in a gradient tensor by replacing them with a zero value such that the gradient tensor may then be converted to a compressed data representation. Gradient pruning may also be performed indirectly, such as by indexing the gradients and generating references to selected gradients that are not being pruned. In some aspects, in addition to other benefits (such as reduced size of the gradient tensor), power usage and other resource needs may be reduced due to the sparsity of the gradient tensor.

For example, in some aspects, a gradient tensor is pruned to remove gradients that fall below a predefined value, magnitude, percentile, or the like. This may include, for example, setting the value of a gradient to zero if it falls below the threshold. In some aspects, this sparse tensor (in which a large number of the values are zero) can be converted or stored using more efficient formats, such as using a dictionary of keys (DOK), a list of lists (LIL), a coordinate list, a compressed sparse row (CSR) format, a compressed sparse column (CSC) format, and the like. This sparse format may allow for more efficient storage and transmission of the pruned gradient tensor. This may be particularly useful in federated learning schemes were gradients need to be transmitted over data connections many times during training.

In some aspects, a set of indices may be determined that relate to gradients within a set (e.g., within a gradient tensor) that satisfy a threshold criteria (e.g., a minimum value, magnitude, or percentile). These indices can then be used to efficiently update corresponding model parameters without the need to explicitly create a sparse gradient representation (e.g., a sparse gradient tensor). Consequently, operations related to parameters that are not associated with an index in the set of indices may be skipped and thus computational time, power, and the like may be saved.

Often, training is performed over a sequence of training iterations or epochs, where each epoch may include one or more forward passes, backward passes, and parameter updates based on one or more sets (or batches) of training data. In some cases, all selected training data may be processed during each training epoch. In subsequent epochs, the training data is again used to refine the model, potentially with differing hyperparameters or other changes. In some aspects, batch gradient descent is used and each epoch can include any number of batches. In other aspects, stochastic gradient descent is used (e.g., where the batch size is one).

In some aspects, the gradients that are to be pruned (and thus the parameters that will be updated) are determined once per epoch, such as at the beginning of the epoch. For example, a gradient tensor produced based on a first batch of training data can be used to identify which gradients should be pruned and which should be applied to parameters to update the model (based on, for example, a threshold criteria). As above, and the gradients that are not pruned may be identified by a set of indices that can be used for all subsequent batches in the epoch. This can significantly reduce computational expense and improve efficiency of the training process.

Figure 1B:
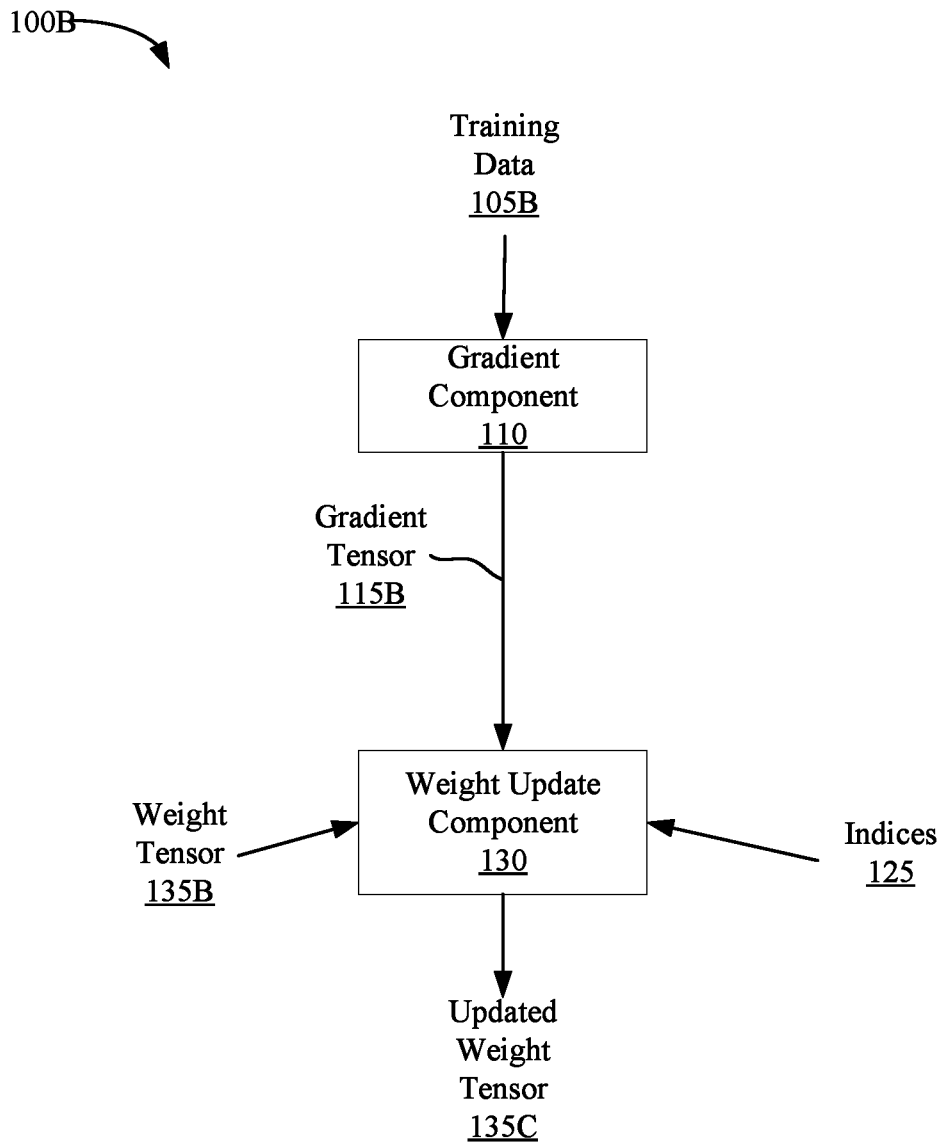

Example Workflows for Improved Training of Machine Learning Models Using Gradient Pruning FIGS. 1A and 1B depict workflows 100A and 100B for training machine learning models using gradient pruning, according to some aspects disclosed herein.

Specifically, FIG. 1A depicts a workflow 100A where the training system evaluates the gradients to identify which should be pruned and generates a set of indices for gradients that are not pruned, while FIG. 1B depicts a workflow 100B where the system uses already determined indices to selectively update the model parameters. For example, FIG. 1B may refer to a scenario in which the unpruned gradients are already known and referenced by a set of indices. In one aspect, the workflow 100A corresponds to the first batch in a given epoch, while the workflow 100B corresponds to a subsequent batch in the given epoch.

As illustrated in FIG. 1A, the workflow 100A begins with a set of training data 105A being received by a training component 110. The training data 105A can generally include any data used to train or refine a machine learning model. For example, the training data 105A may include labeled exemplars used to train a neural network.

The training component 110 is generally configured to process the training data 105A using the model in order to generate a gradient tensor 115A. This may include computing an output using the training data 105A and the current parameters of the model (e.g., the weights), followed by computing the gradient tensor 115A based on the output and the weights (and, in some aspects, a target output for the training data 105A). A gradient tensor 115A is a collection of values (sometimes stored as a matrix), where each value corresponds to a particular parameter in the machine learning model. Each gradient value in the gradient tensor 115A indicates the magnitude and direction of change for the corresponding parameter.

In one aspect, if the model is a neural network, and the gradient tensor 115A is generated by first passing one or more training samples through the model (referred to as a "forward pass") in order to generate an output. This output is then compared to the corresponding label of the training sample using one or more loss functions. The loss (also referred to as "cost" in some aspects) is then back-propagated through model (referred to as a "backward pass") to calculate gradients for each internal parameter of the model. In some aspects, the training component 110 computes gradients for the last layer of the model, then uses these gradients to compute the gradients for the next layer. This is repeated until gradients are computed for all weights.

In aspects, the gradient tensor 115A is typically quite dense, with few (or no) values equal to zero. However, the gradient tensor 115A may include many values that are relatively close to zero. For example, if the gradients can vary between negative one and positive one, a large number of them may be within a range of plus or minus 0.1.

In the illustrated aspect, the gradient tensor 115A is passed to a pruning component 120, which evaluates the gradient tensor 115A to generate a set of indices 125 based on some threshold criteria. For example, if the criteria is a minimum absolute value or magnitude, the pruning component 120 may compare each value in the gradient tensor 115A to the threshold value, and identify indices of gradients that satisfy the criteria. The indices of these gradients in the gradient tensor 115A can then be retained as the set of indices 125.

In another aspect, the pruning component 120 utilizes a percentile-based threshold for the gradient values to generate the indices 125. To do so, the pruning component 120 may first sort the gradients in the gradient tensor 115A based on their absolute value or magnitude (e.g., the distance from zero). The pruning component 120 can then generate the indices 125 by identifying the gradients that satisfy the percentile threshold. For example, if the criteria indicates that only the top ten percent of gradients should be used to update the model (e.g., that are in the ninetieth percentile or greater), the pruning component 120 can identify the indices of the gradients that meet this criterion in the sorted list.

In some aspects, rather than generating indices 125, the pruning component 120 modifies the gradient tensor 115A directly (e.g., to set particular values in the tensor to zero), and returns this modified (potentially compressed) sparsified gradient tensor to the weight update component 130. For example, the pruning component 120 may identify values in the gradient tensor 115A that are below a defined threshold or percentile, and set these identified values to zero.

As illustrated, the gradient tensor 115A and indices 125 are both provided to a weight update component 130. In the illustrated aspect, the weight update component 130 also receives a weight tensor 135A. In an aspect, the weight tensor 135A is the current weights (or any other parameter) of the model that is being trained. The weight update component 130 is generally configured to update one or more of the weights in the weight tensor 135A based on the corresponding gradients specified in the gradient tensor 115A. In some aspects, the weight update component 130 selectively updates the weight tensor 135A based on the indices 125. For example, for each weight in the weight tensor 135A with an index that is specified in the indices 125, the weight update component 130 may identify the corresponding gradient in the gradient tensor 115A and update the weight appropriately. The weight update component 130 may refrain from updating any weights that are not identified in the indices 125.

Based on this update, the weight update component 130 outputs an updated weight tensor 135B, which reflects the updated weights based on the current training cycle. In aspects, this cycle can then be repeated any number of times in order to iteratively refine the model.

In an aspect, the training component 110, pruning component 120, and weight update component 130 are included within a processing system that trains machine learning models. Although depicted as discrete components in the example of FIG. 1A for conceptual clarity, in various aspects, the operations of the training component 110, pruning component 120, and weight update component 130 may be combined or distributed across any number of components. Similarly, the training component 110, pruning component 120, and weight update component 130 may be implemented using hardware, software, or a combination of hardware and software.

As illustrated in FIG. 1B, the workflow 100B begins with a set of training data 105B being received by the training component 110. As with the training data 105A, the training data 105B can generally include any data used to train or refine a machine learning model. In at least one aspect, the training data 105A is the first batch in an epoch, while the training data 105B is the second or any subsequent batch within the epoch.

In FIG. 1B, the training component 110 processes the training data 105B to generate a gradient tensor 115B, as discussed above. This gradient tensor 115B is provided to the weight update component 130. In the workflow 100B, however, the pruning component 120 is not used to identify which gradients to retain. Instead, the indices 125 identified previously (e.g., while processing the first batch in the epoch) are re-used. That is, in some aspects, the system does not re-compute the indices for every batch of data, but instead uses the prior-generated set of indices 125 (e.g., those generated in the workflow 100A depicted in FIG. 1A) for multiple batches. Further, in some aspects, indices 125 may be generated intermittently in different epochs. That is, the indices 125 may be generated for one epoch and reused for one or more other epochs, and then may be regenerated for a different epoch to refresh the indices 125. Such index reuse across one or more epochs or batches of data can significantly reduce the overhead required to evaluate the gradient tensors 115, and therefore reduce the computational expense and time needed to complete the epoch.

As illustrated, the weight update component 130 receives the gradient tensor 115B, the weight tensor 135B from the prior batch, and the indices 125 that were previously determined. As discussed above, the weight update component 130 may identify, for each index in the indices 125, the corresponding weight in the weight tensor 135B and the corresponding gradient in the gradient tensor 115B. These weights can be updated, while all others are left unmodified. This results in a new updated weight tensor 135C for the model. This process can then be repeated any number of times to iteratively train the model.

Figure 2:
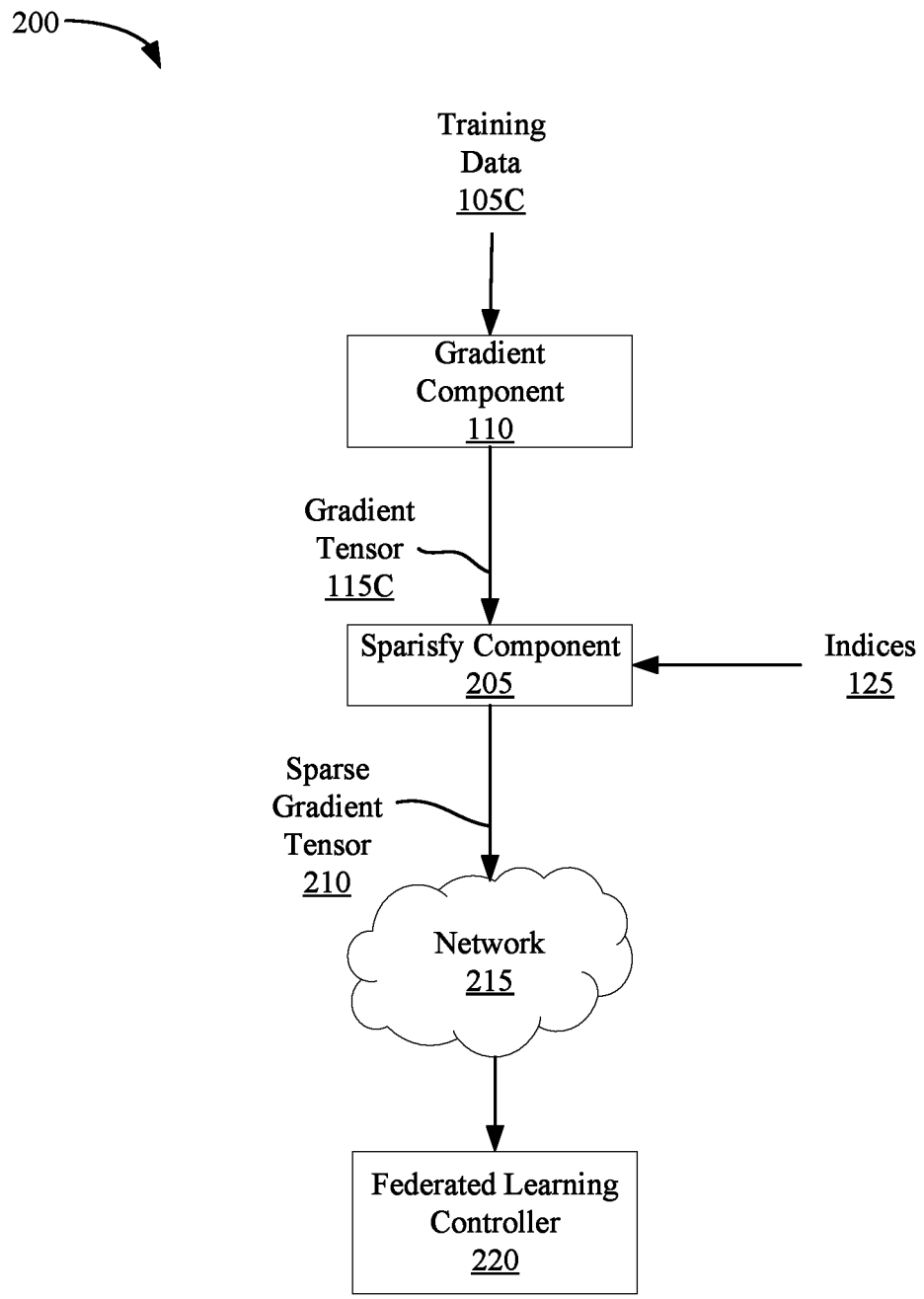
FIG. 2 depicts a workflow for gradient pruning and sparse tensor generation to improve training of machine learning models, according to some aspects disclosed herein.

Example Workflow for Gradient Pruning to
Improve Training of Machine Learning Models FIG. 2 depicts a workflow 200 for gradient pruning and sparse tensor generation to improve training of machine learning models, according to some aspects disclosed herein.

As illustrated, the workflow 200 begins when training data 105C is received by a training component 110. As discussed above, the training component 110 generates a gradient tensor 115C based on the training data 105C. In the illustrated aspect, this gradient tensor 115C is provided to a sparsify component 205. In one aspect, the sparsify component 205 is part of the processing system discussed above.

The sparsify component 205 receives the gradient tensor 115C and the indices 125 (generated by the pruning component 120), and generates a sparse gradient tensor 210. In one aspect, the sparsify component 205 does so by setting the non-selected gradients to zero. That is, for any index not included in the indices 125, the sparsify component 205 may set the corresponding gradient value in the gradient tensor 115C to zero.

Although depicted as discrete components for conceptual clarity, in some aspects, the operations of the gradient component 110 and the sparsify component 205 may be performed by a single component. In at least one such aspect, this combined component can only calculate gradients for elements indicated by the indices 125, refraining from calculating gradients that are not specified in the indices 125.

In some aspects, the sparsify component 205 utilizes a format that improves the efficiency of storing, processing, and/or transmitting the sparse gradient tensor 210. For example, the sparse gradient tensor 210 may only include the indices 125, and a gradient value for each index 125. In one aspect, the sparse gradient tensor 210 is a generated in a CSR format.

In the illustrated aspect, the sparse gradient tensor 210 can be transmitted (e.g., via a network 215) to one or more other components. For example, in a federated learning system, the sparse gradient tensor 210 can be transmitted to a federated learning controller 220. The federated learning controller 220 aggregates gradients from a variety of participants in order to generate an overarching model.

In a federated learning system, each participant generally trains a local model using its own training data, and transmits only the gradients (or the updated weights of the local model) to a centralized collector. The central component then aggregates these updated gradients or weights in order to update a global model. Thus, in conventional systems, every participant must transmit the entire (dense) gradient tensor or (dense) weight tensor.

However, by using the sparse gradient tensor 210, the system can significantly reduce the network bandwidth required to transmit the updated gradients to the federated learning controller 220. That is, by refraining from transmitting any gradients below a predefined threshold (or by refraining from transmitting any weights that were not changed because the corresponding gradient was pruned), the system reduces the amount of data that is transmitted for each round.

Example Gradient Distributions

Figure 3:
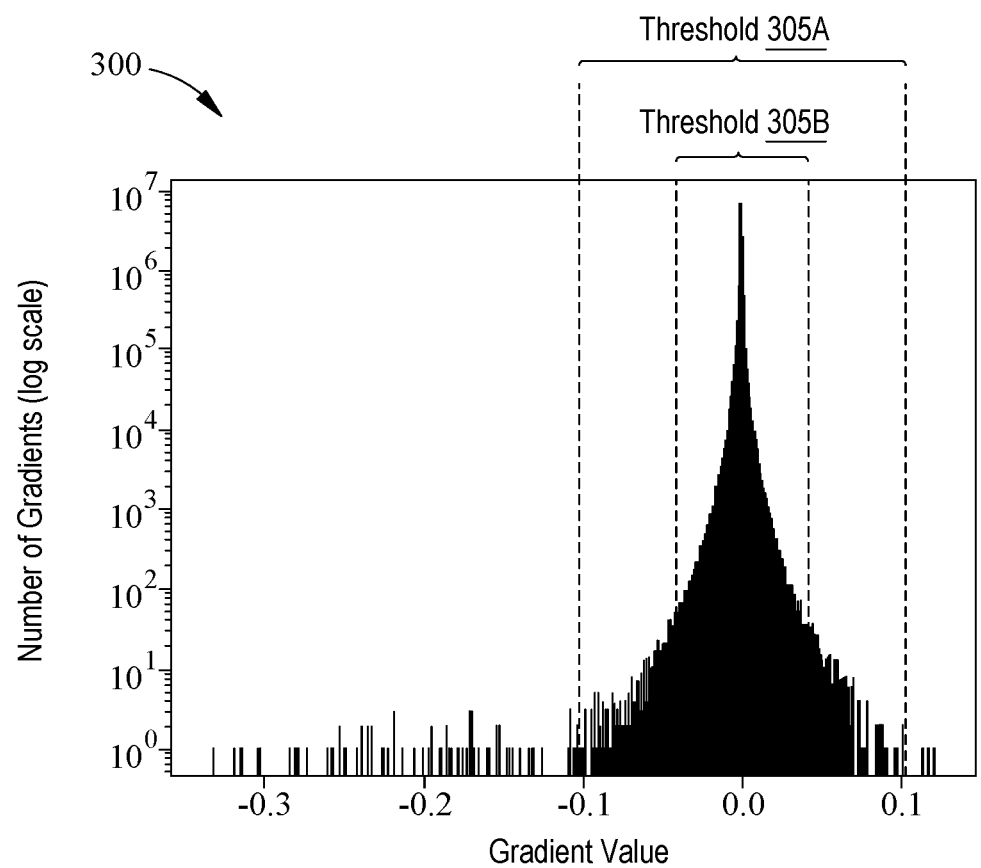
FIG. 3 is a graph depicting a distribution of gradient values in a tensor, according to some aspects disclosed herein.

FIG. 3 depicts an example histogram 300 of gradient values in a tensor. In the illustrated histogram 300, gradient values from a gradient tensor 115 are delineated on the horizontal axis, while the number of individual gradients in the tensor that have that value are graphed on the vertical axis using a logarithmic scale.

As illustrated, the percentage of gradients within a first example range 305A of (−0.1 to 0.1), which may alternatively be referred to as within a threshold magnitude of to 0.1) is significant. Far fewer gradients have fall outside of example range 305 (e.g., having a magnitude greater than 0.1). Example range 305B is narrower and likewise has a smaller magnitude threshold of around 0.05, and a smaller percentage of gradients falls within example range 305B.

Histogram 300 demonstrates that there are potentially a high percentage of gradients with very small magnitudes, which can thus be pruned with relatively minor impact on the model parameters. The criteria for pruning can be modified, for example, based on device type, timing constraints, or other factors in order to make a tradeoff between ultimate model accuracy and efficiency in training the model. Moreover, the criteria for pruning can be changed over the course of a training session, for example, increasing or decreasing the magnitude cutoff for pruning as a model starts to converge during training.

Example Method for Training of Machine Learning Models Using Gradient Pruning

Figure 4:
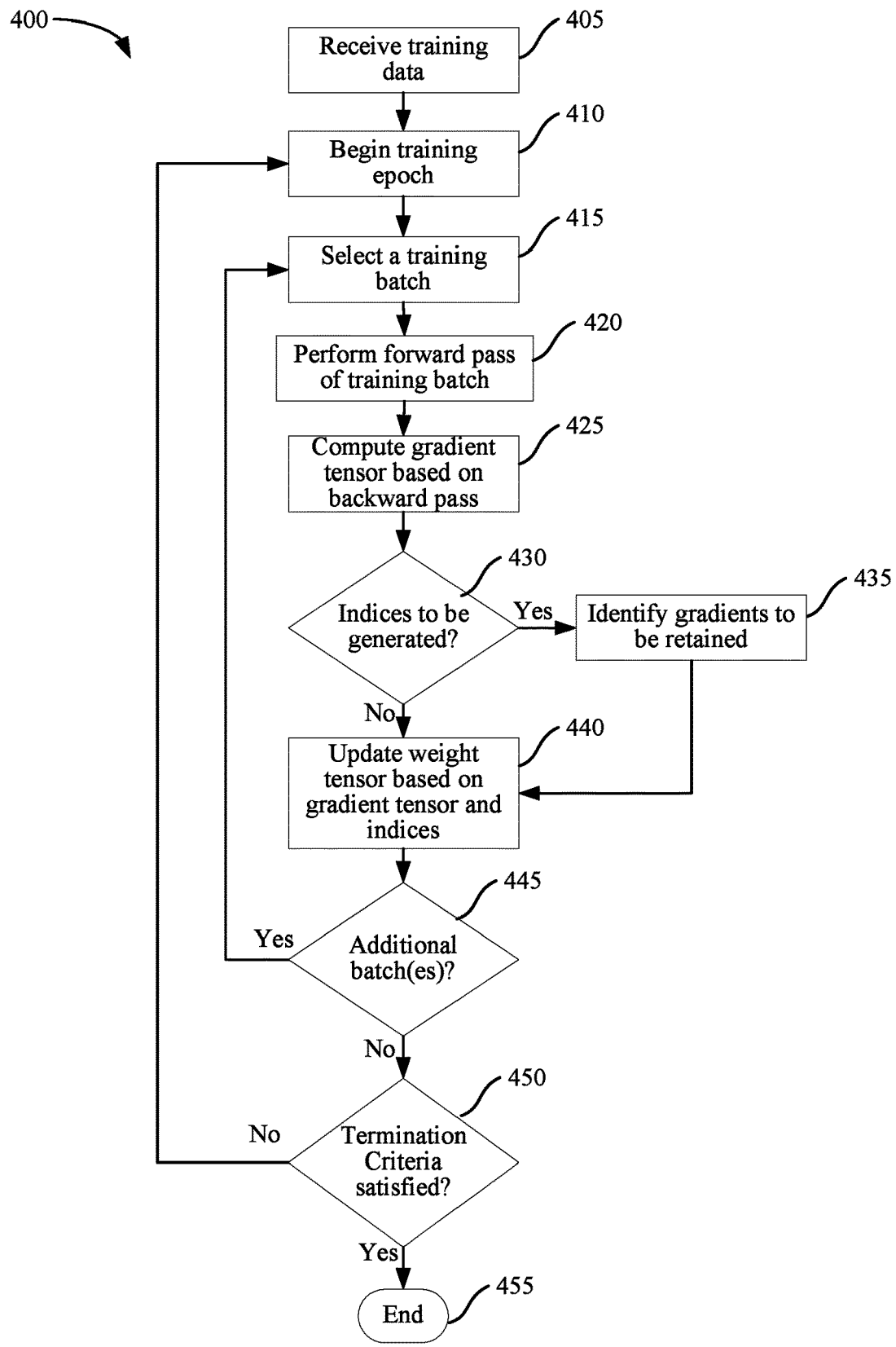
FIG. 4 depicts a method of training of machine learning models more efficiently by using gradient pruning, according to some aspects disclosed herein.

FIG. 4 depicts a method 400 of training of machine learning models more efficiently using gradient pruning, according to some aspects disclosed herein.

The method 400 begins at block 405, where training data is received (e.g., by a training component 110). In aspects, the training data can be received from any data source, and can include any number of exemplars. The method 400 then continues to block 410.

At block 410, the processing system begins a training epoch. As discussed above, an epoch generally refers to a training cycle where the entire training dataset is passed through the model once. In some aspects, this may be accomplished as a sequence of batches.

At block 415, the processing system selects a batch of training data for processing. In aspects, the processing system may use any criteria to select the training batch, as all of the training data will (eventually) be utilized during the epoch.

The method 400 then continues to block 420, where the processing system performs a forward pass of the training batch using the machine learning model to generate output (e.g., predictions, classifications, and the like). This output can be compared to the labels of the training data in order to compute the loss or cost.

At block 425, the processing system then generates a gradient tensor by using a backward pass through the model (e.g., based on the output, loss, or cost). In aspects, the gradient tensor generally specifies a magnitude and sign of change for each parameter in the model in order to improve its accuracy.

In some aspects, even if some gradients will not be used to update the model, the processing system still computes a gradient for each parameter. For example, to utilize gradient descent in a neural network, the processing system generally computes the gradients for the last layer (based on the loss function), then uses these gradients to compute gradients for the immediately-prior layer. This process repeats (where the gradients for a given layer depend on some or all of the gradients for the immediately-subsequent layer) until the system reaches the first layer.

In some aspects, therefore, even if some gradients will be ignored during the weight update process, they are still computed because they may be required to compute another gradient that is retained. In at least one aspect, however, the processing system can selectively generate individual gradients as well. For example, if a given gradient will be pruned and is not needed to compute the gradients of the prior layer, the processing system may refrain from computing the gradient. In one such aspect, if it is determined that computing a gradient in a given layer requires another gradient that was not computed, the processing system can return and compute that prior gradient.

In at least one aspect, determining whether the prior gradient is required is based in part on a contribution or impact of the current gradient. That is, the system may use some threshold contribution or impact to determine whether the gradient currently being computed (which cannot be computed without the prior ignored gradient) has an impact or contribution above a defined threshold. If so, the system may return and compute the prior (ignored) gradient, followed by the current gradient. If not, the system may refrain from computing the current gradient as well, and proceed to the next gradient.

After generating the gradient tensor, the method 400 proceeds to block 430.

At block 430, the processing system determines whether indices are to be generated for the current batch. That is, the processing system determines whether it should generate a new set of indices for gradients to be used in refining the model, or if it should re-use a previously-generated set of indices. In some aspects, this includes determining whether the current training batch is the first in the epoch. That is, the processing system may generate indices only for the first batch of an epoch, and use these indices for all subsequent batches of the epoch.

In some aspects, the processing system can utilize other criteria in determining whether to generate a new set of indices. For example, in one aspect, the processing system can determine whether to generate new indices based at least in part on the current accuracy of the model. In one such aspect, if the current accuracy is below a predefined threshold, then the processing system can identify new indices in an effort to accelerate the training. In contrast, if the accuracy is above a predefined threshold, then the processing system may refrain from generating new indices.

In some aspects, the processing system may utilize different criteria based at least in part on the stage of training. For example, in early epochs, the processing system may re-compute the indices multiple times in an epoch (e.g., two or more times in the same epoch separated by some number of batches), while in later epochs the processing system may generate the indices only once for the entire epoch. In some aspects, the processing system can re-use indices from a prior epoch rather than generating new indices for the current epoch. Generally, many different criteria may be utilized in determining whether to re-generate the set of indices.

If the processing system determines that no new indices should be generated, then the method 400 continues to block 440. If, however, the processing system determines that a new set of indices should be identified, then the method 400 continues to block 435.

At block 435, the processing system identifies the gradients which are to be used for updating a model (e.g., retained gradients). In one aspect, the processing system identifies the retained gradients, which is generally a subset of the full set of gradients, by pruning the full set of gradients using one or more criteria, such as a range of values, a threshold value (or magnitude), and others. The retained gradients may be represented in various forms, such as directly by building a sparsified gradient tensor where all pruned gradients have their values set to zero, or indirectly, such as by reference using indices identifying the retained gradients in a gradient tensor representing the full set of gradients. One aspect of identifying the indices to be retained is discussed in more detail below, with reference to FIG. 5. The method 400 then continues to block 440.

At block 440, the processing system updates the weight tensor based on the gradient tensor and the set of indices. In an aspect, as discussed above, this includes updating only those weights which correspond to one of the indices. Weights which are not specified in the set of indices may be left unchanged.

In an aspect, this selective update can significantly reduce the time and compute resources required to update the model. For example, pruning ninety percent of gradients can reduce the time needed per epoch by more than half with only a small reduction in model accuracy. Although the time savings are significant, they are typically not equal to the percent of gradients pruned. This is due to the other training processes that are not affected by the pruning, including batch loading, the forward pass through the model, and the computation of all gradients.

The techniques disclosed herein can be leveraged for significant improvements in a variety of deployments. For example, neural architecture search (NAS) is a technique for automating the design of neural network architecture. Conventional NAS approaches typically take on the order of one thousand graphics processing unit (GPU) days to complete, as training each individual architecture can take several days alone. By using techniques described herein to significantly reduce the time and compute resources needed for each training session, NAS methodologies become far more practical and scalable.

In one aspect, updating a given weight includes increasing or decreasing the value of the weight based, at least in part, on the corresponding gradient. In this way, the weight tensor iteratively moves towards a more optimal set of values that produces accurate results. One aspect of updating the weight tensor is discussed in more detail below, with reference to FIG. 6.

The method 400 then continues to block 445, where the processing system determines whether there is at least one additional batch that has not yet been evaluated in the current epoch. That is, the processing system checks whether all of the available training data has been used in the epoch. If not, then the method 400 returns to block 410 to select the next batch. If all of the data has been used in the current epoch, the method 400 proceeds to block 450.

At block 450, the processing system determines whether predefined termination criteria are satisfied. The termination criteria generally relate to any conditions or events indicating that the training should stop. This may include, by way of example and not limitation, a maximum number of epochs, a maximum amount of time, a minimum accuracy of the model, and the like. For example, if the newly-updated weights cause the model to perform with sufficient accuracy (or some other performance metric), the processing system may determine that training should stop.

If the criteria are not satisfied at step 450, then the method 400 returns to block 410 to begin the next training epoch. In some aspects, the different epochs may utilize the same or different values for various hyperparameters in order to iteratively train the model. If the termination criteria are satisfied, the method 400 terminates at block 435.

Figure 5:
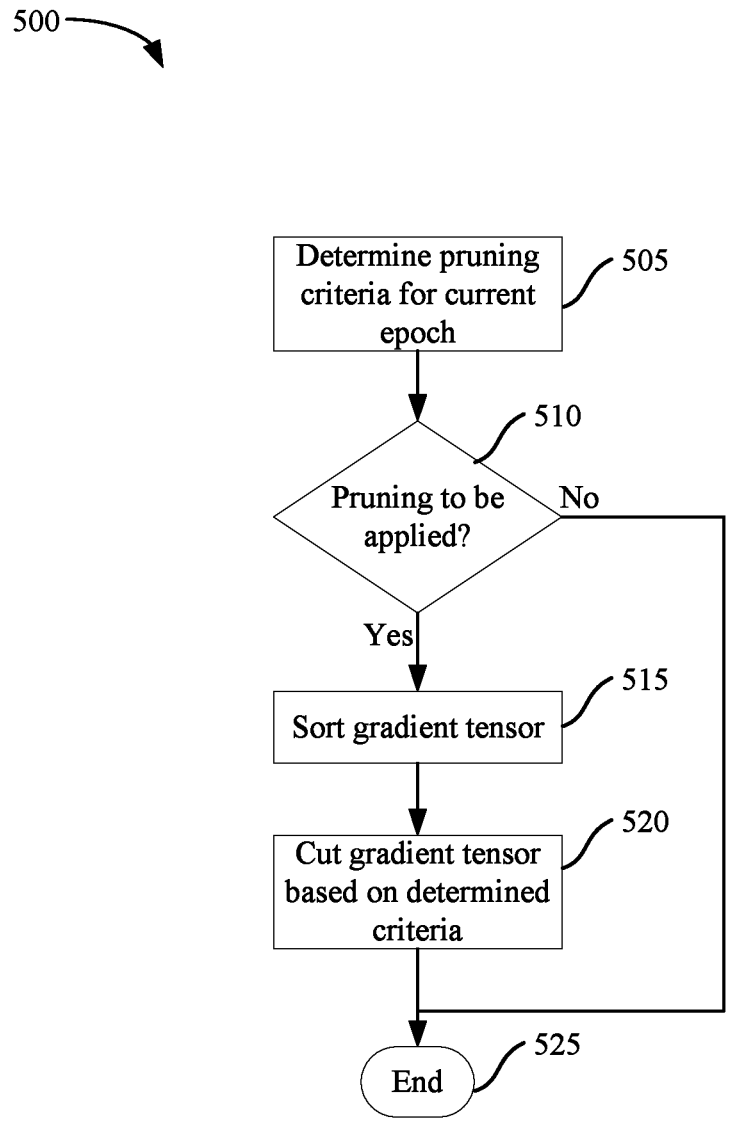
FIG. 5 depicts a method of pruning gradient tensors to improve training of machine learning models, according to some aspects disclosed herein.

Example Method for Pruning Gradient Tensors to Improve Training of Machine Learning Models FIG. 5 depicts a method 500 of pruning gradient tensors to improve training of machine learning models, according to some aspects disclosed herein. In one aspect, the method 500 provides additional detail for block 435 of FIG. 4.

The method 500 begins at block 505, where a processing system determines the pruning criteria for the current epoch. In some aspects, the pruning criteria is the same across all epochs. For example, the criteria may specify to use only the top ten percent of the gradients in terms of magnitude.

In other aspects, the pruning criteria may change across epochs. For example, the processing system may prune relatively more or fewer gradients at early epochs, as compared to later ones. Often, the gradients will tend to converge towards zero as training progresses. In one such aspect, the processing system uses a lower threshold in early epochs such that fewer gradients are pruned (e.g., prune all gradients with a magnitude smaller than 0.01) and a higher threshold in later epochs such that more gradients are pruned (e.g., prune all gradients smaller than 0.1). Thus, in this example, the number (or percentage of) gradients pruned will generally increase as the threshold is increased over epochs.

In another aspect, the processing system may ramp the pruning down towards the end of training. That is, the processing system may prune fewer gradients in the last epoch, as compared to the first. This may help in deployments in which the final few epochs (where the last few tweaks are made to the weights) are important for accuracy.

Once the pruning criteria has been determined, the method 500 continues to block 510 where the processing system determines whether any pruning is to be used in the current epoch. For example, the processing system may determine whether the pruning criteria specifies to prune or remove any gradients. If not, then the method 500 terminates at block 525 and the processing system uses all computed gradients to update the weight tensor.

If pruning is to be applied, the method 500 continues to block 515, where the processing system sorts the gradient tensor based on the magnitude of each gradient.

At block 520, the processing system then cuts the gradient tensor based on the determined criteria. For example, if the criteria specify to prune any gradients below the ninetieth percentile, the processing system may select all gradients above this threshold, and discard the rest. The indices corresponding to these selected gradients can then be used as the set of indices to be retained. In aspects, any suitable pruning criteria and technique can be utilized.

Figure 6:
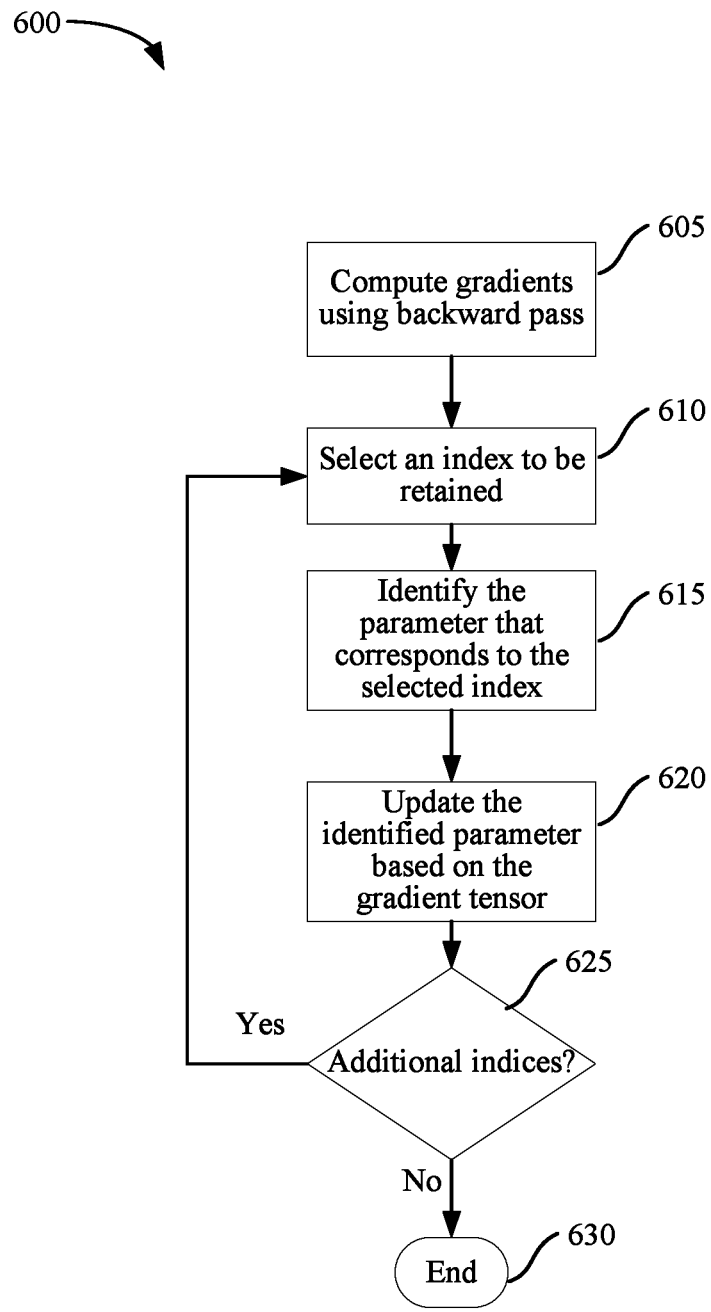
FIG. 6 depicts a method of training of machine learning models using gradient pruning by selectively updating model parameters, according to some aspects disclosed herein.

Example Method for Training of Machine Learning Models Using Gradient Pruning by Selectively Updating Model Parameters FIG. 6 depicts a method 600 of training of machine learning models using gradient pruning by selectively updating model parameters, according to some aspects disclosed herein. In one aspect, the method 600 provides additional detail for block 440 of FIG. 4.

The method 600 begins at block 605, where the processing system computes gradients for the training using a backwards pass, as discussed above. At block 610, the processing system selects one of the indices from the determined set of indices that are to be retained. In aspects, the processing system can utilize any suitable criteria for selecting the index, as all of the retained indices will eventually be utilized.

At block 615, the processing system identifies the parameter that corresponds to the selected index. For example, the processing system may identify the weight, from a weight tensor, that is associated with the selected index. The method 600 then continues to block 620, where the processing system updates the identified parameter based on the gradient tensor. For example, the processing system may use the selected index to identify the corresponding gradient in the gradient tensor, and update the identified weight based on the identified gradient. The method 600 then continues to block 625.

At block 625, the processing system determines whether there are any additional indices in the set of retained indices that have not yet been utilized. If so, then the method 600 returns to block 610 to select the next index. If not, then the method 600 terminates at block 630.

Example Method for Training of Machine Learning Models Using Gradient Pruning

Figure 7:
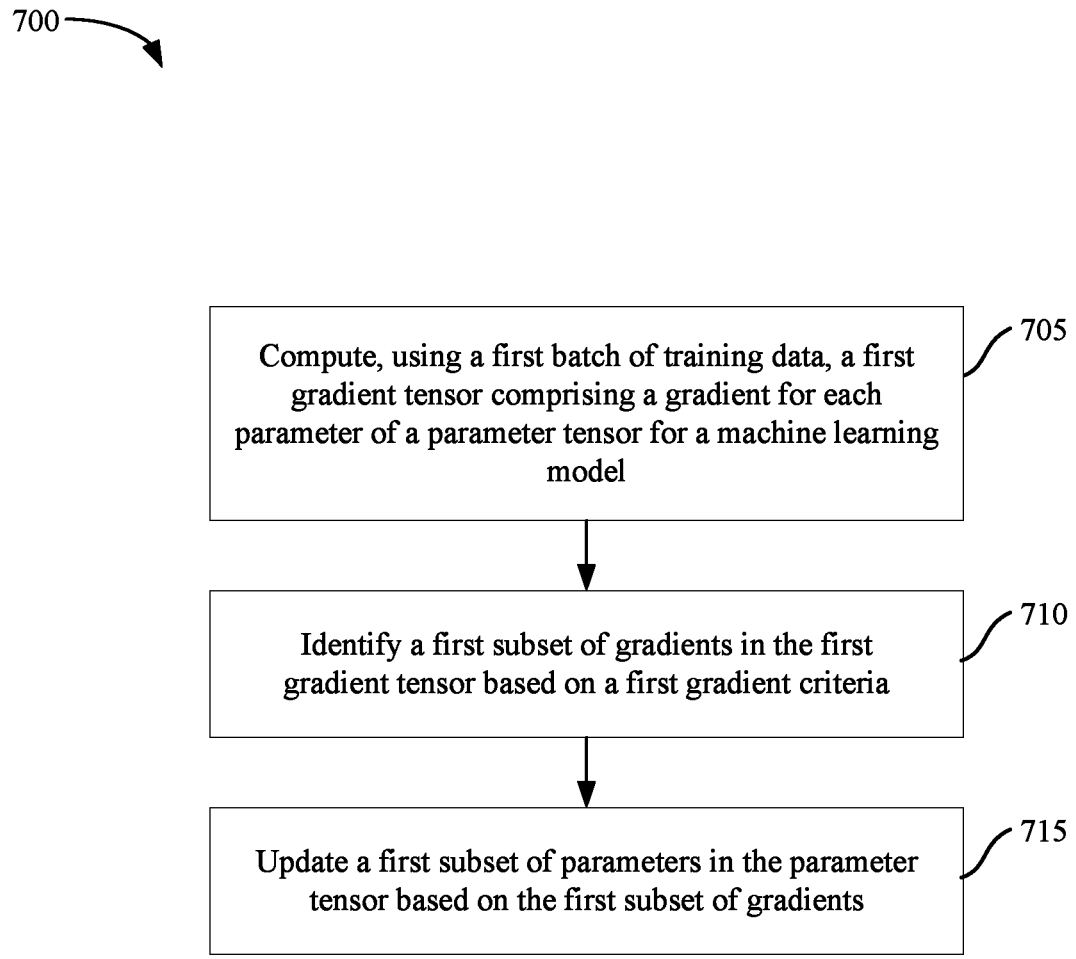
FIG. 7 depicts a method of training of machine learning models using gradient pruning, according to some aspects disclosed herein.

FIG. 7 depicts a method 700 of training of machine learning models using gradient pruning, according to some aspects disclosed herein. The method 700 begins at block 705, where a processing system computes, using a first batch of training data, a first gradient tensor comprising a gradient for each parameter of a parameter tensor for a machine learning model.

At block 710, the processing system identifies a first subset of gradients in the first gradient tensor based on a first gradient criteria.

The method 700 then continues to block 715, where the processing system updates a first subset of parameters in the parameter tensor based on the first subset of gradients.

In some aspects, method 700 further includes generating a sparse gradient tensor based on the first subset of gradients.

In some aspects, method 700 further includes transmitting the sparse gradient tensor to a remote server managing federated learning of the machine learning model, for example, as discussed above with respect to FIG. 2.

In some aspects of method 700, the sparse gradient tensor is stored in a compressed sparse row (CSR) format.

In some aspects, method 700 further includes computing, using a second batch of training data, a second gradient tensor comprising a gradient for each parameter of the parameter tensor; determining a first set of indices corresponding to the first subset of gradients in the first gradient tensor; and updating the first subset of parameters in the parameter tensor based on the first set of indices and the second gradient tensor.

In some aspects, method 700 further includes computing, using a second batch of training data, a second gradient tensor comprising a gradient for each parameter of the parameter tensor; and identifying a second subset of gradients in the second gradient tensor based on a second gradient criteria.

In some aspects of method 700, the first subset of gradients comprises more gradient values than the second subset of gradients. In other aspects of method 700 the first subset of gradients comprises fewer gradient values than the second subset of gradients.

In some aspects of method 700, the first gradient criteria comprises one of a range, a magnitude, or a percentile value.

In some aspects of method 700, updating the first subset of parameters in the parameter tensor comprises: modifying only parameters in the parameter tensor that correspond to gradients in the first subset of gradients.

Example System for Improved Training of Machine Learning Models Using Gradient Pruning In some aspects, the workflows and methods described with respect to FIGS. 1-7 may be performed on one or more devices.

Figure 8:
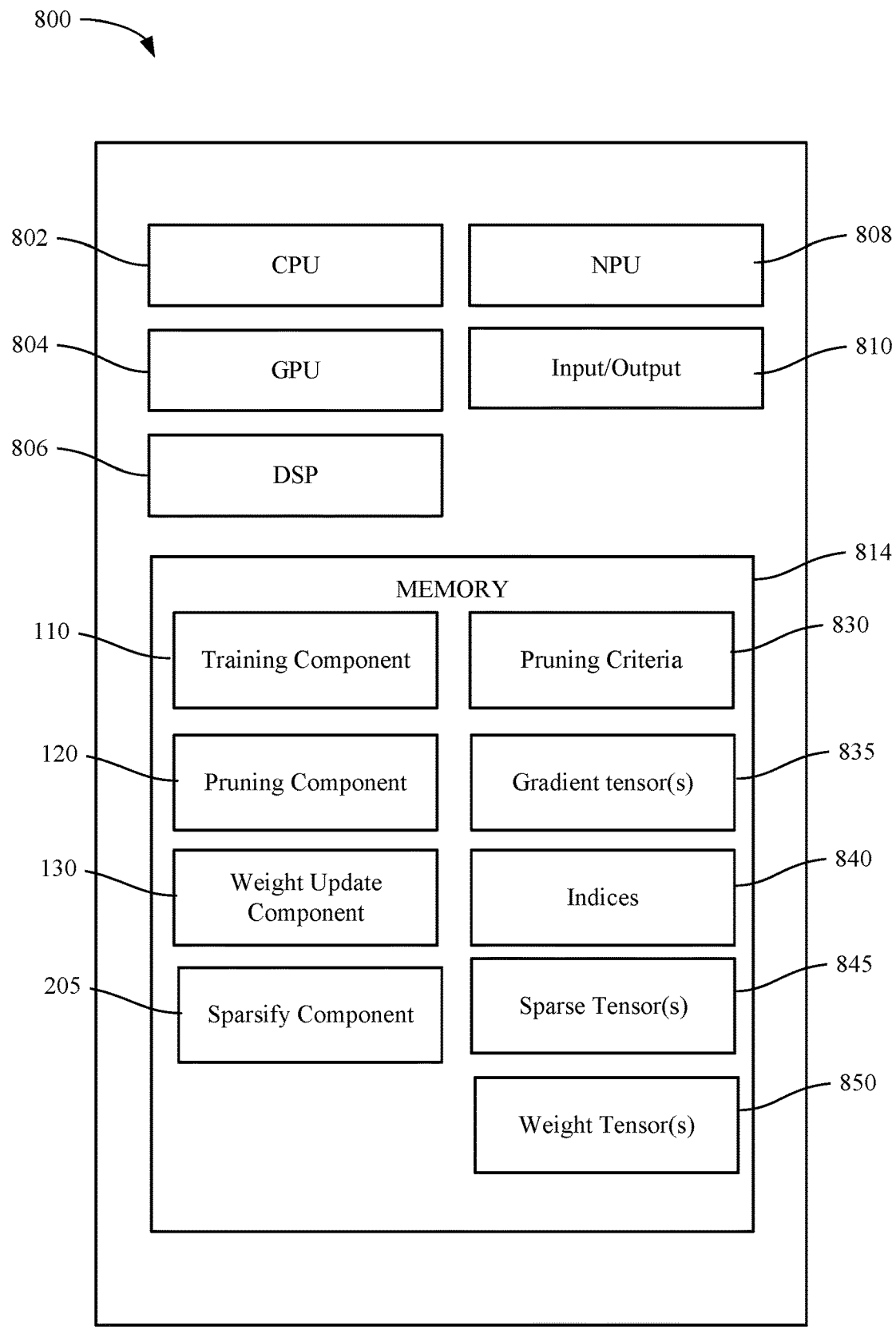
FIG. 8 depicts a block diagram illustrating a processing system configured to train machine learning models using gradient pruning, according to some aspects disclosed herein.

FIG. 8 depicts a processing system 800 which may be configured to perform aspects of the various methods described herein, including, for example, the methods described with respect to FIGS. 1-7.

Processing system 800 includes a central processing unit CPU 802, which in some examples may be a multi-core CPU. Instructions executed at the CPU 802 may be loaded, for example, from a program memory associated with the CPU 802 or may be loaded from a memory 814.

Processing system 800 also includes additional processing components tailored to specific functions, such as a graphics processing unit (GPU) 804, a digital signal processor (DSP) 806, and a neural processing unit (NPU) 808. In some aspects, an NPU may sometimes alternatively be referred to as tensor processing units (TPU), neural network processor (NNP), intelligence processing unit (IPU), vision processing unit (VPU), or graph processing unit.

Though not depicted in FIG. 8, NPU 808 may be implemented as a part of one or more of CPU 802, GPU 804, and/or DSP 806.

The processing system 800 also includes input/output 810. In some aspects, the input/output 810 is communicatively coupled with an antenna. For example, the input/output 810 may be coupled with a transmitter, receiver, and/or transceiver in order to send and receive signal data.

Although not included in the illustrated aspect, the processing system 800 may also include one or more input and/or output devices, such as screens, physical buttons, speakers, microphones, and the like.

Processing system 800 also includes memory 814, which is representative of one or more static and/or dynamic memories, such as a dynamic random access memory, a flash-based static memory, and the like. In this example, memory 814 includes computer-executable components, which may be executed by one or more of the aforementioned processors of processing system 800.

In this example, memory 814 includes a training component 110, a pruning component 120, a weight update component 130, and a sparsify component 205. The depicted components, and others not depicted, may be configured to perform various aspects of the methods discussed above.

In the illustrated example, the memory 814 further includes a set of pruning criteria 830, gradient tensors 835, indices 840, sparse tensors 845, and weight tensors 850. Although depicted as residing in memory 814, in aspects, the pruning criteria 830, gradient tensors 835, indices 840, sparse tensors 845, and weight tensors 850 may reside in any suitable location.

In an aspect, the pruning criteria 830 generally includes one or more thresholds or other criteria used to determine which gradients to prune and which to retain. For example, the pruning criteria 830 may specify a threshold percentile, where any gradients below the percentile (in terms of their absolute value) are discarded. In some aspects, the pruning criteria 830 may differ according to any number of conditions, including the current epoch, the accuracy of the model, and the like.

The gradient tensors 835 are generally representative of the gradient(s) computed at any stage of training. In the illustrated aspect, the indices 840 correspond to the set of indices, identified by the pruning component 120, which are to be retained.

The illustrated aspect also includes one or more sparse tensors 845, which generally include the non-zero weights for a gradient tensor (after being pruned based on the pruning criteria 830). Additionally, the weight tensors 850 are generally included to represent the various internal parameters used by the machine learning models. The weight tensors 850 are iteratively updated based on the gradient tensors and the indices.

Example Clauses

Clause 1: A method of training a machine learning model, comprising: computing, using a first batch of training data, a first gradient tensor comprising a gradient for each parameter of a parameter tensor for a machine learning model; identifying a first subset of gradients in the first gradient tensor based on a first gradient criteria; and updating a first subset of parameters in the parameter tensor based on the first subset of gradients.

Clause 2: The method of Clause 1, further comprising: generating a sparse gradient tensor based on the first subset of gradients in the first gradient tensor.

Clause 3: The method of Clause 2, further comprising: transmitting the sparse gradient tensor to a remote server managing federated learning of the machine learning model.

Clause 4: The method of any one of Clauses 2 or 3, wherein the sparse gradient tensor is stored in a compressed sparse row (CSR) format.

Clause 5: The method of any one of Clauses 1-4, further comprising: computing, using a second batch of training data, a second gradient tensor comprising a gradient for each parameter of the parameter tensor; determining a first set of indices corresponding to the first subset of gradients in the first gradient tensor; and updating the first subset of parameters in the parameter tensor based on the first set of indices and the second gradient tensor.

Clause 6: The method of any one of Clauses 1-5, further comprising: computing, using a second batch of training data, a second gradient tensor comprising a gradient for each parameter of the parameter tensor; and identifying a second subset of gradients in the second gradient tensor based on a second gradient criteria.

Clause 7: The method of Clause 6, wherein the first subset of gradients comprises more gradient values than the second subset of gradients.

Clause 8: The method of any one of Clauses 6-7, wherein the first subset of gradients comprises fewer gradient values than the second subset of gradients.

Clause 9: The method of any one of Clauses 1-8, wherein the first gradient criteria comprises a percentile value.

Clause 10: The method of any one of Clauses 1-9, wherein updating the first subset of parameters in the parameter tensor comprises: modifying only parameters in the parameter tensor that correspond to gradients in the first subset of gradients.

Clause 11: A method of training a machine learning model, comprising: computing, during a first training epoch, using a first batch of training data, a first gradient tensor comprising a gradient for each parameter of a parameter tensor for a machine learning model; identifying a first subset of gradients in the first gradient tensor based on a first gradient threshold; determining a first set of indices corresponding to the first subset of gradients in the first gradient tensor; and updating a first subset of parameters in the parameter tensor based on the first set of indices and the first subset of gradients in the first gradient tensor.

Clause 12: The method of Clause 11, further comprising: generating a sparse gradient tensor based on the first set of indices and the first subset of gradients in the first gradient tensor.

Clause 13: The method of any one of Clauses 11-12, further comprising: computing, during the first training epoch, using a second batch of training data, a second gradient tensor comprising a gradient for each parameter of the parameter tensor; and updating the first subset of parameters in the parameter tensor based on the first set of indices and the second gradient tensor.

Clause 14: The method of any one of Clauses 11-13, further comprising: computing, during a second training epoch, using a second batch of training data, a second gradient tensor comprising a gradient for each parameter of the parameter tensor; and identifying a second subset of gradients in the second gradient tensor based on a second gradient threshold.

Clause 15: The method of any one of Clauses 11-14, wherein updating the first subset of parameters in the parameter tensor comprises: modifying only parameters in the parameter tensor that correspond to indices in the first set of indices.

Clause 16: A processing system, comprising: a memory comprising computer-executable instructions; and one or more processors configured to execute the computer-executable instructions and cause the processing system to perform a method in accordance with any one of Clauses 1-15.

Clause 17: A non-transitory computer-readable medium comprising computer-executable instructions that, when executed by one or more processors of a processing system, cause the processing system to perform a method in accordance with any one of Clauses 1-15.

Clause 18: A computer program product embodied on a computer-readable storage medium comprising code for performing a method in accordance with any one of Clauses 1-15.

Clause 19: A processing system, comprising means for performing a method in accordance with any one of Clauses 1-15.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for training a machine learning model, comprising:
    computing using a first batch of training data, a first gradient tensor comprising a gradient for each parameter of a parameter tensor for a machine learning model;
    identifying a first subset of gradients in the first gradient tensor based on evaluating each respective gradient of the first gradient tensor using a first gradient criteria; and
    updating a first subset of parameters in the parameter tensor based on the first subset of gradients.

2. The method of claim 1, further comprising: generating a sparse gradient tensor based on the first subset of gradients in the first gradient tensor.

3. The method of claim 2, further comprising: transmitting the sparse gradient tensor to a remote server managing federated learning of the machine learning model.

4. The method of claim 2, wherein the sparse gradient tensor is stored in a compressed sparse row (CSR) format.

5. The method of claim 1, further comprising:
    computing, using a second batch of training data, a second gradient tensor comprising a gradient for each parameter of the parameter tensor;
    determining a first set of indices corresponding to the first subset of gradients in the first gradient tensor; and
    updating the first subset of parameters in the parameter tensor based on the first set of indices and the second gradient tensor.

6. The method of claim 1, further comprising:
computing, using a second batch of training data, a second gradient tensor comprising a gradient for each parameter of the parameter tensor; and
identifying a second subset of gradients in the second gradient tensor based on a second gradient criteria.

7. The method of claim 6, wherein the first subset of gradients comprises more gradient values than the second subset of gradients.

8. The method of claim 6, wherein the first subset of gradients comprises fewer gradient values than the second subset of gradients.

9. The method of claim 1, wherein the first gradient criteria comprises a percentile value.

10. The method of claim 1, wherein updating the first subset of parameters in the parameter tensor based on the first subset of gradients is performed during a training iteration and comprises modifying only parameters in the parameter tensor that correspond to gradients in the first subset of gradients, wherein at least one parameter in the parameter tensor that does not correspond to any gradient in the first subset of gradients is not updated during the training iteration.

11. The method of claim 1, further comprising deploying the machine learning model to generate model outputs.

12. A non-transitory computer-readable medium comprising computer-executable instructions that, when executed by one or more processors of a processing system, cause the processing system to perform an operation comprising:
computing using a first batch of training data, a first gradient tensor comprising a gradient for each parameter of a parameter tensor for a machine learning model;
identifying a first subset of gradients in the first gradient tensor based on evaluating each respective gradient of the first gradient tensor using a first gradient criteria; and
updating a first subset of parameters in the parameter tensor based on the first subset of gradients.

13. The non-transitory computer-readable medium of claim 12, wherein the operation further comprises: generating a sparse gradient tensor based on the first subset of gradients in the first gradient tensor.

14. The non-transitory computer-readable medium of claim 13, wherein the operation further comprises: transmitting the sparse gradient tensor to a remote server managing federated learning of the machine learning model.

15. The non-transitory computer-readable medium of claim 12, wherein the operation further comprises:
computing, using a second batch of training data, a second gradient tensor comprising a gradient for each parameter of the parameter tensor;
determining a first set of indices corresponding to the first subset of gradients in the first gradient tensor; and
updating the first subset of parameters in the parameter tensor based on the first set of indices and the second gradient tensor.

16. The computer-readable medium of claim 12, the operation further comprising:
computing, using a second batch of training data, a second gradient tensor comprising a gradient for each parameter of the parameter tensor; and
identifying a second subset of gradients in the second gradient tensor based on a second gradient criteria.

17. The computer-readable medium of claim 16, wherein the first subset of gradients comprises more gradient values than the second subset of gradients.

18. The computer-readable medium of claim 16, wherein the first subset of gradients comprises fewer gradient values than the second subset of gradients.

19. The computer-readable medium of claim 12, wherein the first gradient criteria comprises a percentile value.

20. The computer-readable medium of claim 12, wherein updating the first subset of parameters in the parameter tensor based on the first subset of gradients is performed during a training iteration and comprises modifying only parameters in the parameter tensor that correspond to gradients in the first subset of gradients, wherein at least one parameter in the parameter tensor that does not correspond to any gradient in the first subset of gradients is not updated during the training iteration.

21. A processing system, comprising:
a memory comprising computer-executable instructions; and
one or more processors configured to execute the computer-executable instructions and cause the processing system to perform an operation comprising:
computing, using a first batch of training data, a first gradient tensor comprising a gradient for each parameter of a parameter tensor for a machine learning model;
identifying a first subset of gradients in the first gradient tensor based on evaluating each respective gradient of the first gradient tensor using a first gradient criteria; and
updating a first subset of parameters in the parameter tensor based on the first subset of gradients.

22. The processing system of claim 21, wherein the operation further comprises: generating a sparse gradient tensor based on the first subset of gradients in the first gradient tensor.

23. The processing system of claim 22, wherein the operation further comprises: transmitting the sparse gradient tensor to a remote server managing federated learning of the machine learning model.

24. The processing system of claim 21, wherein the operation further comprises:
computing, using a second batch of training data, a second gradient tensor comprising a gradient for each parameter of the parameter tensor;
determining a first set of indices corresponding to the first subset of gradients in the first gradient tensor; and
updating the first subset of parameters in the parameter tensor based on the first set of indices and the second gradient tensor.

25. The processing system of claim 21, wherein the operation further comprises:
computing, using a second batch of training data, a second gradient tensor comprising a gradient for each parameter of the parameter tensor; and
identifying a second subset of gradients in the second gradient tensor based on a second gradient criteria.

26. The processing system of claim 25, wherein the first subset of gradients comprises more gradient values than the second subset of gradients.

27. The processing system of claim 25, wherein the first subset of gradients comprises fewer gradient values than the second subset of gradients.

28. The processing system of claim 21, wherein the first gradient criteria comprises a percentile value.

29. The processing system of claim 21, wherein updating the first subset of parameters in the parameter tensor based on the first subset of gradients is performed during a training iteration and comprises modifying only parameters in the parameter tensor that correspond to gradients in the first subset of gradients, wherein at least one parameter in the parameter tensor that does not correspond to any gradient in the first subset of gradients is not updated during the training iteration.

30. A processing system configured to train a machine learning model, comprising:
   means for computing, using a first batch of training data, a first gradient tensor comprising a gradient for each parameter of a parameter tensor for a machine learning model;
   means for identifying a first subset of gradients in the first gradient tensor based on evaluating each respective gradient of the first gradient tensor using a first gradient criteria; and
   means for updating a first subset of parameters in the parameter tensor based on the first subset of gradients.

* * * * *